United States Patent [19]
Louder et al.

[11] 3,885,879
[45] May 27, 1975

[54] DUAL BEAM SPECTROPHOTOMETER UTILIZING A SPECTRAL WEDGE AND BIFURCATED FIBER OPTIC BUNDLE

[75] Inventors: Nevitt M. Louder, Verona; Warren G. Gillingham, Pittsburgh, both of Pa.

[73] Assignee: Fisher Scientific Company, Pittsburgh, Pa.

[22] Filed: June 25, 1973

[21] Appl. No.: 372,931

[52] U.S. Cl. ................ 356/189; 250/227; 356/96; 356/100
[51] Int. Cl. ............................ G01j 3/48; G01j 3/42
[58] Field of Search ............ 356/189, 186, 100, 96, 356/97, 88, 93, 94; 250/227; 350/166, 96 B

[56] References Cited
UNITED STATES PATENTS

| | | | |
|---|---|---|---|
| 1,751,584 | 3/1930 | Hansell | 250/227 |
| 2,708,389 | 5/1955 | Kavanagh | 350/166 |
| 3,068,742 | 12/1962 | Hicks, Jr. et al. | 250/227 |
| 3,457,002 | 7/1969 | Margath | 350/166 |
| 3,525,869 | 8/1970 | Gubisch | 350/96 B |
| 3,583,813 | 6/1971 | Shibata et al. | 356/93 |
| 3,692,415 | 9/1972 | Shiller | 350/96 B |
| 3,707,030 | 12/1972 | Hunter et al. | 350/96 B |
| 3,733,137 | 5/1973 | Badessa | 356/93 |

*Primary Examiner*—Vincent P. McGraw
*Attorney, Agent, or Firm*—Webb, Burden, Robinson & Webb

[57] ABSTRACT

A spectrophotometer including an adjustable spectral wedge, interposed between a light source and photosensitive means, for selecting wavelengths of light and improved fiber optics for transmitting the selected wavelengths to a sample to be analyzed. Single and dual beam spectrophotometers are disclosed.

9 Claims, 5 Drawing Figures

DUAL BEAM SPECTROPHOTOMETER UTILIZING A SPECTRAL WEDGE AND BIFURCATED FIBER OPTIC BUNDLE

This invention relates to a spectrophotometer.

There are several elements which are basic to all spectrophotometers, namely: a light source; means for separating the light from the source into different wavelengths; means for sensing the separated wavelengths; and means for reading the output of the sensing means. In prior spectrophotometers there has been the need for precisely adjusted mechanical means in discriminating and isolating specific wavelengths of light and means for transmitting such wavelengths to sensing means with minimal mechanical effort and consequent improved readout accuracy. The present spectrophotometer meets this need and utilizes adjustable means for selecting the desired wavelengths and novel means for transmitting such wavelengths to the sensing means.

Various means have been used for separating the light source into different wavelengths, including prisms, diffraction gratings and spectral wedges. More specifically, U.S. Pat. No. 2,708,389 discloses a type of spectral wedge interference filter which may be mounted so that it can be moved relative to a slit conventionally employed for selecting a band of wavelengths.

Some prior devices in which light dividers have been used have required a rigid optical bench and extensive means for eliminating stray light and atmospheric contamination. Among such devices, for example, are those having front-surfaced or rear-surfaced mirrors; those having mirrors which intercept half of the light transmitted; and devices known as flicker wheels in which a vaned mirror is rotated through the light path. The disadvantage of front-surfaced mirrors is that the reflective coating is easily attacked by atmospheric pollutants and cannot be cleaned without some degrading of the coating. Rear-surfaced mirrors have the coating well protected; however, they produce double images, limiting their usefulness in optical systems. Moreover, these conventional means in beam-splitting optical systems are subject to dust collection and require rigid, precision mounts and adjustments. Our spectrophotometer does not have a rigid optical bench, requires no precise adjustment of the light transmission means as in the case of conventional optical systems and bifurcated, beam-splitting fiber optics are used which are conveniently enclosed, eliminating the disadvantages of dust collection, stray light, and precise mechanical adjustment.

Briefly, we have invented a spectrophotometer including an adjustable spectral wedge, which may be rectangular or circular, interposed between a light source and photosensitive means, for selecting a narrow band of wavelengths of light and improved fiber optics for transmitting the selected wavelengths to a sample to be analyzed. In our invention, we have improved upon the use of the spectral wedge as a means for discriminating desired light wavelengths and have eliminated the slit utilized in prior spectrophotometers. Moreover, we have combined the adjustable spectral wedge with a light transmitting means comprising fiber optics for passing the selected wavelengths to the sensing means, thereby increasing the efficiency of light transmission and improving the accuracy of the sensing means and the readout. In addition, the fiber optics absorbs much of the heat generated by the light source and essentially isolates the sensing means, which are preferably temperature sensitive photocells.

Our improved fiber optics comprise a bundle having an end formed in a substantially rectangular cross-section of a length nearly approaching the height of a rectangular spectral wedge, which we prefer, and of sufficient width to cover a range of the wedge to isolate desired wavelengths dependent upon the characteristics of the sample to be analyzed with the spectrophotometer. The size of the substantially rectangular cross-section is dependent upon the specific application and the required band width. Typically, however, the width of the fiber optics is approximately 20 nanometers (millimicrons).

The opposite end of the fiber optics may be connected directly to a block mounting measuring means to provide a single beam device; or it may be divided into two branches one of which is directly connected to a block mounting measuring means and the other of which is also directly connected to the block in alignment with reference means to provide a dual beam device. The measuring means and the reference means are referred to herein as sensing or photosensitive means and may be photocells.

In the case of a dual beam device particularly, wherein the bundle is divided at one end into two branches, the fiber optics light conductive threads or filaments are so combed or distributed within the bundle that a substantially equal number of threads extend from all portions of the end having a rectangular cross-section to the end of each branch. Substantially equivalent distribution of fiber optics threads results in a substantially identical light transmission through each branch of the fiber optics, thus minimizing error which would otherwise occur due to the presence of factors such as variable intensity of the light source, distortion of the lamp filament, and the like. Use of the dual beam or branched fiber optics, in other words, permits the reference means to be affected in the same way as the measuring means but for the sample being analyzed. Although similar fiber optics are known, as shown for example in U.S. Pat. No. 3,707,030, they have not been formed as described herein.

While we prefer the dual beam device, the invention is not limited thereto and the description hereinafter should not be interpreted otherwise.

Figure 1:
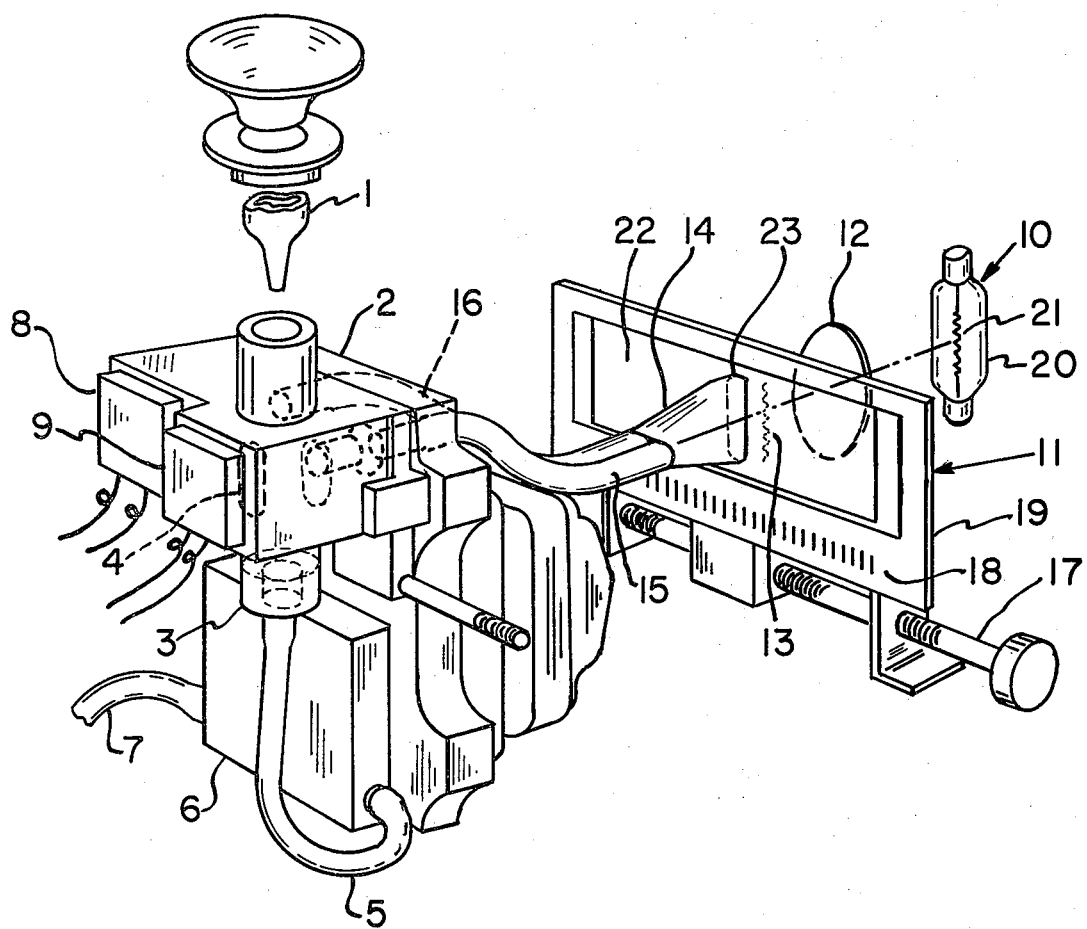
FIG. 1 is a perspective view of the preferred dual beam spectrophotometer according to the invention.

In a spectrophotometer in accordance with the preferred embodiment illustrated in FIG. 1, a transparent cuvet 1 containing a liquid sample to be analyzed is adapted to be placed in a block 2 in a conventional manner. The cuvet fits into a cylindrical guide 3, usually of metal, having opposed slots 4 in its sidewall for permitting light to pass through. A waste tube 5 is provided for disposing of the sample after it is analyzed.

The waste sample is removed by a pump 6 or other suitable means through a drain tube 7.

Sensing means comprising two photocells are located on the block 2. The photocells are conventional identical photocells 8, 9. They may have their own external power source, as in the case of a photo resistive cell. A photovoltaic type cell, which generates its own current proportional to the quantity of the incident light, may also be used. Both cells receive light transmitted from a light source 10 which impinges upon a rectangular spectral wedge 11. A lens 12 may be interposed between light source 10 and wedge 11 to concentrate the light from the source on the wedge in an elongated pattern 13.

Fiber optics 14, which are conveniently enclosed in vinyl sleeves, are positioned on the opposite side of the wedge from the impinging light pattern. A branch 15 of the fiber optics is connected to the block 2 in alignment with the sample contained in the cuvet 1 and the measuring cell 9. Branch 16 of the fiber optics is connected to the block such that the light transmitted therethrough is received by the reference cell 8.

The preferred spectral wedge 11 (FIG. 2) is adjustable by means of a screw 17 to select the desired wavelengths of light to be transmitted through the fiber optics. A scale 18 on frame 19 of the wedge enables an operator to determine the position of the wedge and to select the wavelengths desired. The scale is linear and is preferably denoted in nanometers. In the preferred embodiment the wedge spectrum extends from approximately 400 nanometers to about 700 nanometers, all in the visual range.

A preferred light source 10 comprises an elongated envelope 20 and a single wound filament 21 of a length such that the light pattern 13 extends substantially the entire height of the surface 22 of the wedge.

Figure 3:
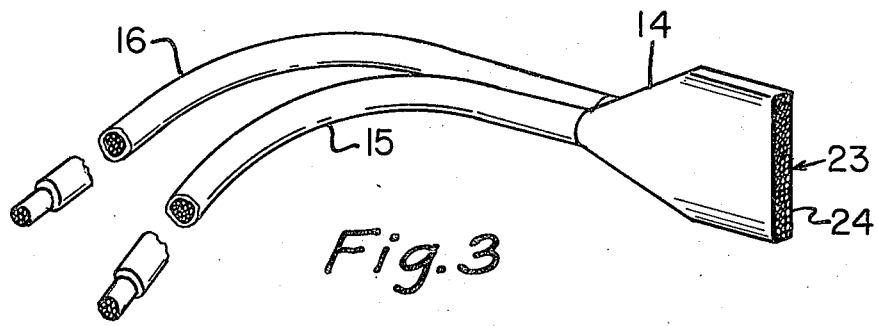
FIG. 3 is a partial perspective view of branched fiber optics for use in the spectrophotometer of FIG. 1.

End 23 of the fiber optics 14 adjacent the wedge and opposite the light pattern 13, as shown in FIG. 3, is formed in a substantially rectangular cross-section having a length substantially equal to the pattern 13 and a width of sufficient size to receive and discriminate wavelengths over a narrow band pass. Practically and typically the width of end 23 is approximately 20 nanometers.

The threads or filaments 24 of the fiber optics 14 extend from the end 23 to the ends of the branches 15, 16 and are so distributed within the fiber optics so that light passed from end 23 at any portion thereof is passed in an equivalent amount to each end of the branches and thus to the sample and photocells 8 and 9.

Figure 4:
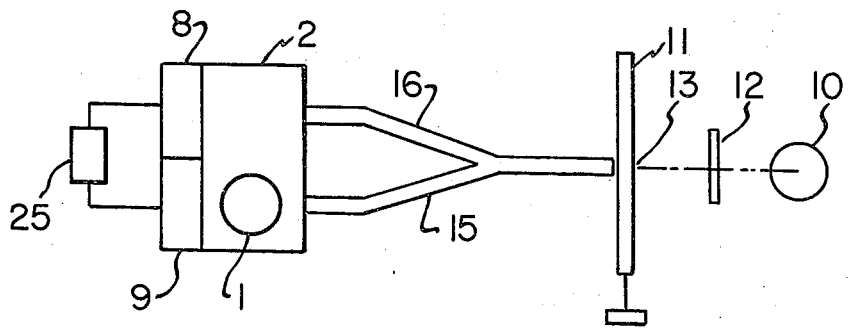
FIG. 4 is a diagrammatic illustration of the elements of the spectrophotometer of FIG. 1.

The operation of the spectrophotometer according to the invention in the preferred dual beam embodiment is diagrammatically illustrated in FIG. 4. The instrument is first calibrated using distilled water which is subsequently emptied.

Figure 2:
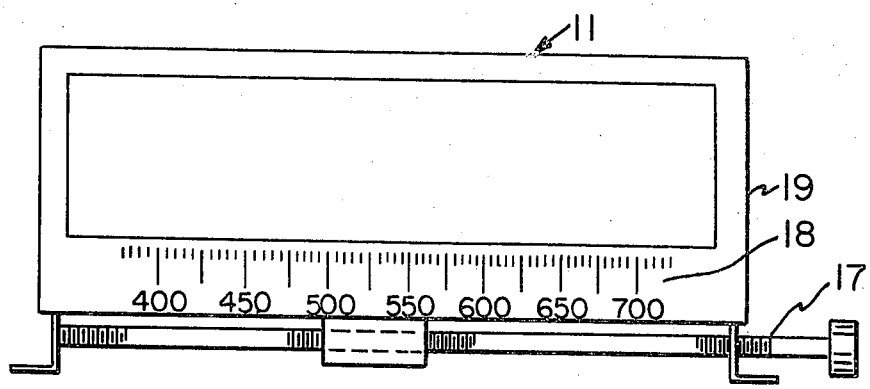
FIG. 2 is an elevation view of the improved spectral wedge.

Liquid samples believed to contain hemoglobin, for example, are placed in cuvet 1. Since the colorimetric absorption of hemoglobin, in its oxygenated form for example is greatest and the percentage of light transmission is maximum at 540 nanometers, under known conditions, the wedge 11 is adjusted, using scale 18 (FIG. 2), to position the wedge opposite the light pattern 13 at approximately 540 nanometers, as shown in FIG. 2. The area of the wedge covered is approximately equal to the height of the wedge × 20 nanometers, 10 nanometers extending to each side of the 540 position.

Having selected the band for acceptable discrimination, light from source 10 is passed through lens 12 to spectral wedge 11 where it impinges upon one face of the wedge in the form of an elongated pattern 13 substantially equal to the height of the wedge. The light is then passed into the end 23 of fiber optics 14 and into and through each branch 15 and 16 of the fiber optics. The light passing through branch 15, of course, passes through the liquid sample. The hemoglobin absorbs the transmitted light proportional to its concentration and the remaining light passes to measuring cell 9. Simultaneously, the light passing through branch 16 of the fiber optics passes through an air space in the block 2 to the reference cell 8. The current of the measuring cell and the reference cell is compared and the current difference is indicated on an analog or digital readout or display 25, such as a micro-ammeter or a digital reader. Additional samples are then analyzed in the same manner and the results recorded from the readout or display.

Figure 5:
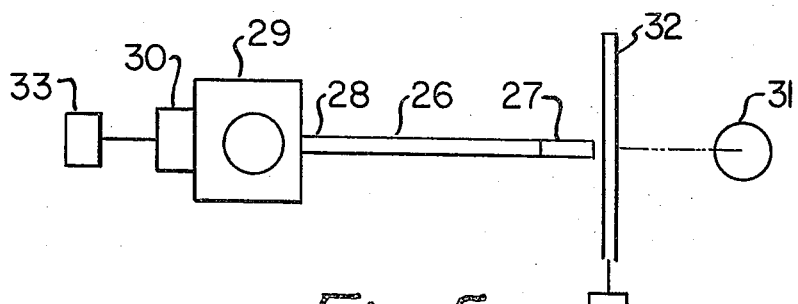
FIG. 5 is a diagrammatic illustration of the elements of a single beam spectrophotometer.

The invention can also be applied as a single beam device (FIG. 5) by using fiber optics 26 one end 27 of which is formed in a rectangular cross-section in the manner heretofore described and the other end 28 of which is directly connected to block 29 opposite photosensitive means comprising a measuring cell 30 such that light passed from light source 31 through wedge 32 to the fiber optics passes through samples to the measuring cell. By establishing a reference of maximum light transmission, any change in current due to the presence of a sample in the spectrophotometer is reflected as a decrease from reference on the readout or display 33. Samples may be analyzed as previously described; however, the single beam device is subject to slight variations due, for example, to light source filament heating along the length of the filament giving different color temperatures, hot spots, or evaporation of the filament which cannot be continuously monitored and corrected as in the dual beam device.

In addition to the embodiments described, it is apparent that the principles of the invention can be applied to analyze a liquid sample accurately and with a minimum of equipment. A spectrophotometer according to the invention can be constructed and maintained at substantially less cost than any similar device heretofore commercially available which makes our spectrophotometer particularly attractive for use by private physicians and clinics. The spectrophotometer provides accurate analysis of samples by a trained operator provided it is properly calibrated.

Having described preferred embodiments of the invention, it is to be understood that the invention is limited only by the scope of the appended claims.

We claim:
1. A spectrophotometer comprising:
  A. a source of light;
  B. an adjustable wedge for selecting wavelengths of light from the source;
  C. a reference means and a measuring means for sensing the selected wavelengths;
  D. bifurcated fiber optics comprising a bundle of light conductive threads, one end of the bundle being of rectangular cross section and disposed adjacent the wedge, the opposite end of the bundle being divided into two branches, each branch containing approximately one half of the number of threads in the end of rectangular cross section, one branch being so positioned to transmit light through a sample to be analyzed to the measuring means and the other branch being so positioned to transmit light to the reference means; and E. means for comparing the output of the sensing means.

2. A spectrophotometer as set forth in claim 1 wherein the spectral wedge is adjustable over a range of wavelengths from about 400 to about 700 nanometers.

3. A spectrophotometer as set forth in claim 1 in which the sensing means comprises a reference cell and a measuring cell.

4. A spectrophotometer as set forth in claim 1 and including means for displaying the comparison of the output of the cells.

5. A spectrophotometer as set forth in claim 4 in which the display means is a micro-ammeter.

6. A spectrophotometer as set forth in claim 1 wherein the end of the fiber optics adjacent the wedge has a substantially rectangular cross-section of a length approximately the height of the light of the wedge and a width of approximately 20 nanometers.

7. A spectrophotometer as set forth in claim 1 wherein the light source is a single filament lamp which presents an elongated light pattern on a face of the wedge.

8. A spectrophotometer as set forth in claim 1 and having means for holding a sample disposed between the end of one branch of the fiber optics bundle and the measuring means.

9. A spectrophotometer as set forth in claim 8 in which the end of one branch of the fiber optics bundle is directly connected to the sample holding means.

* * * * *